United States Patent [19]
Matsui

[11] Patent Number: 6,104,551
[45] Date of Patent: *Aug. 15, 2000

[54] ZOOM LENS APPARATUS

[75] Inventor: Nobuo Matsui, Omiya, Japan

[73] Assignee: Fuji Photo Optical Co., Ltd., Omiya, Japan

[ * ] Notice: This patent is subject to a terminal disclaimer.

[21] Appl. No.: 09/306,818

[22] Filed: May 7, 1999

[30] Foreign Application Priority Data

May 8, 1998 [JP] Japan ................................. 10-125775

[51] Int. Cl.$^7$ .................................................. G02B 15/14
[52] U.S. Cl. ......................... 359/700; 359/676; 359/689; 359/699
[58] Field of Search .................... 359/700, 676, 359/689, 699

[56] References Cited

U.S. PATENT DOCUMENTS 5,787,767  8/1998  De Bernardi ............................. 74/813
5,907,439  5/1999  Matsui ..................................... 359/700

FOREIGN PATENT DOCUMENTS 10-142471  5/1998  Japan .

*Primary Examiner*—Georgia Epps
*Assistant Examiner*—Tim Thompson
*Attorney, Agent, or Firm*—Nixon Peabody LLP; David S. Safran

[57] ABSTRACT

A zoom lens apparatus moves the first lens group and the second lens group by rotating a zoom cam cylinder with cam grooves formed thereon. A plurality of forcing members uniformly forces first cam followers, which are provided on a lens supporting frame for the first lens group, against one sides of the cam grooves. Likewise, the plurality of forcing members uniformly forces second cam followers, which are provided on a lens supporting frame for the second lens group, against the other sides of the cam grooves.

6 Claims, 4 Drawing Sheets

ZOOM LENS APPARATUS

CROSS REFERENCE TO RELATED APPLICATIONS

This application is related to pending U.S. Pat. No. 5,907,439 entitled ZOOM LENS APPARATUS WITH SHARED CAM GROOVE, filed by the applicant of the present application, and assigned t the assignee of the present application,

BACKGROUND OF THE. INVENTION

1. Field of the Invention

This invention relates generally to a zoom lens apparatus, and more particularly to a zoom lens apparatus with a variable frame lens group, an aberration correcting lens group and a focus correcting lens group.

2. Description of Related Art

In the past, a zoom lens apparatus performed the zooming by using a variable frame lens group and a focus correcting lens group. Recently, these two lens groups and an aberration correcting lens group have been used to improve the zooming performance.

In such the conventional zoom lens apparatus, a zoom cam cylinder is rotatably arranged in a lens barrel, and three kinds of cam grooves are formed on the zoom cam cylinder. Cam followers of the variable frame lens group, cam followers of the aberration correcting lens and cam followers of the focus correcting lens group are fitted in the three kinds of the cam grooves, respectively. The cam followers are arranged through the cam grooves to be fitted in straight grooves of a fixed cylinder, which is arranged outside the zoom cam cylinder. Thus, rotating the zoom cam cylinder moves the variable lens group, the aberration correcting lens group and the focus correcting lens group forward and backward along an optical axis due to the operation of the cam followers, the cam grooves and the straight grooves.

In the conventional zoom lens apparatus, however, the three kinds of cam grooves are formed on the zoom cam cylinder in order to move the variable frame lens group, the aberration correcting lens group and the focus correcting lens group, respectively. Consequently, the zoom cam cylinder must be long, and the zoom lens apparatus must be large.

To address this problem, the applicant of the present invention has already proposed a zoom lens apparatus, in which one cam groove is commonly used for two lens groups among the variable frame lens group, the aberration correcting lens group and the focus correcting lens group (U.S. Pat. No. 5,907,439 corresponding to Japanese Patent provisional publication No. 10-142471). A cam follower of one lens group of the two lens groups is pressed against one side wall of the cam groove, and a cam follower of the other lens group is pressed against the other side wall of the cam groove.

This zoom lens apparatus, however, uses one coil spring with a large diameter in order to press the cam followers of the two lens groups against the side walls of the cam groove, and the coil spring is arranged between the two lens groups. For this reason, a plurality of cam followers (e.g., three) provided at each lens supporting frame for each lens group are not pressed uniformly. This results in deviation of the optical axis of the lens group at the zooming when the lens supporting frame comes in contact with a stopper at the zoom end. Consequently, image on a monitor gets rough.

SUMMARY OF THE INVENTION

In view of the foregoing, it is an object of the present invention to provide a downsized zoom lens apparatus with a short zoom cam cylinder and prevents deviation of the optical axis at zooming.

To achieve the above-mentioned object, the present invention is directed to a zoom lens apparatus comprising: a first lens frame supporting a first lens group, the first lens frame having a plurality of first cam followers on an outside thereof; a second lens frame supporting a second lens group, the second lens frame having a plurality of second cam followers on an outside thereof; a cylinder supporting the first and second lens frames therein movably on an axis thereof, the cylinder having a plurality of first cam faces and a plurality of second cam faces, the first cam faces having the same first cam curve, each of the first cam faces engaging with each of the first cam followers, the second cam faces having the same second cam curve, each of the second cam faces engaging with each of the second cam followers; and a plurality of forcing members operatively connecting to the first and second lens frames, the forcing members pressing the first cam followers against the first cam faces and pressing the second cam followers against the second cam faces.

According to the present invention, the cam grooves are commonly used for the first and second lens groups, and this reduces the length of the zoom cam cylinder and downsizes the zoom lens apparatus. Moreover, the plurality of forcing members uniformly forces the first and second lens groups. This prevents the change of the optical axis at the zooming.

The first and second lens groups may be two of a variable frame lens group, an aberration correcting lens group and a focus correcting lens group. The first and second lens groups preferably have similar cam diagrams. The first cam followers and the second cam followers preferably face each other along the optical axis. The forcing members may be provided between the first and second lens frames. Both ends of the forcing members may be arranged close to the first and second cam followers. The cylinder may have a plurality of grooves on the inside thereof, first side walls of the grooves are the first cam faces, and second side walls of the grooves are the second cam faces.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

This invention will be described in further detail by way of example with reference to the accompanying drawings.

Figure 1:
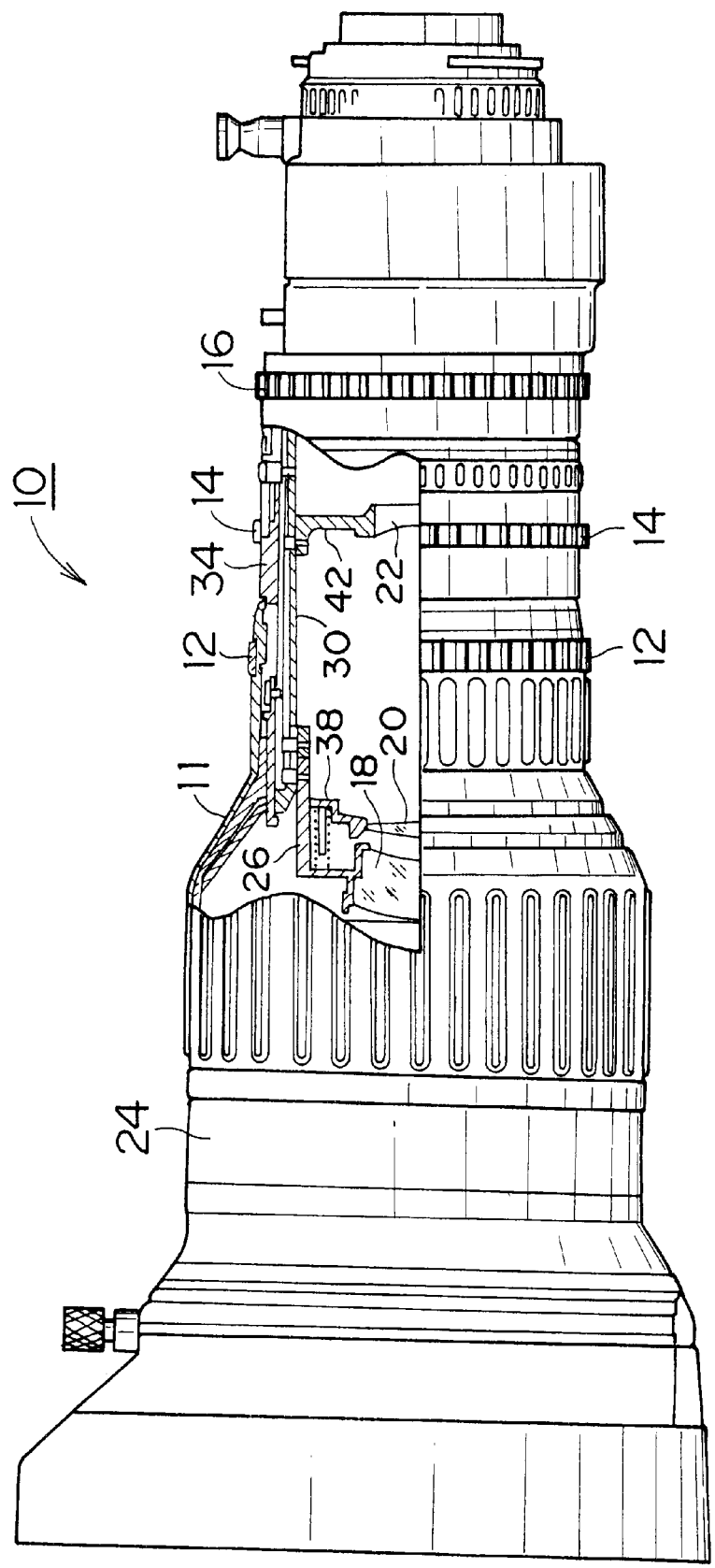
FIG. 1 is a partially-broken side view showing a zoom lens apparatus for an ENG camera according to the present invention.

FIG. 1 is a partially-broken side view showing a TV lens for an electronic news-gathering (ENG) camera according to the present invention. A focus ring 12, a zoom ring 14 and an iris ring 16 are provided on a lens barrel 10 of the TV lens. In the lens barrel 10, a focus lens group (not shown), a variable frame lens group 18 and an aberration correcting lens group 20, a focus correcting lens group 22, an iris and a relay lens (not shown) are arranged in the lens barrel 10 successively from the left in FIG. 1.

The focus lens group is supported in a focus lens barrel 24, which is integrated with the focus ring 12. The focus lens barrel 24 is supported in a body 11 of the lens barrel 10 by a helicoid screw mechanism so that the focus lens group 24 can move freely forward and backward. Thus, the rotation of the focus ring 12 drives the focus lens group forward and backward to thereby adjust the focus.

Figure 2:
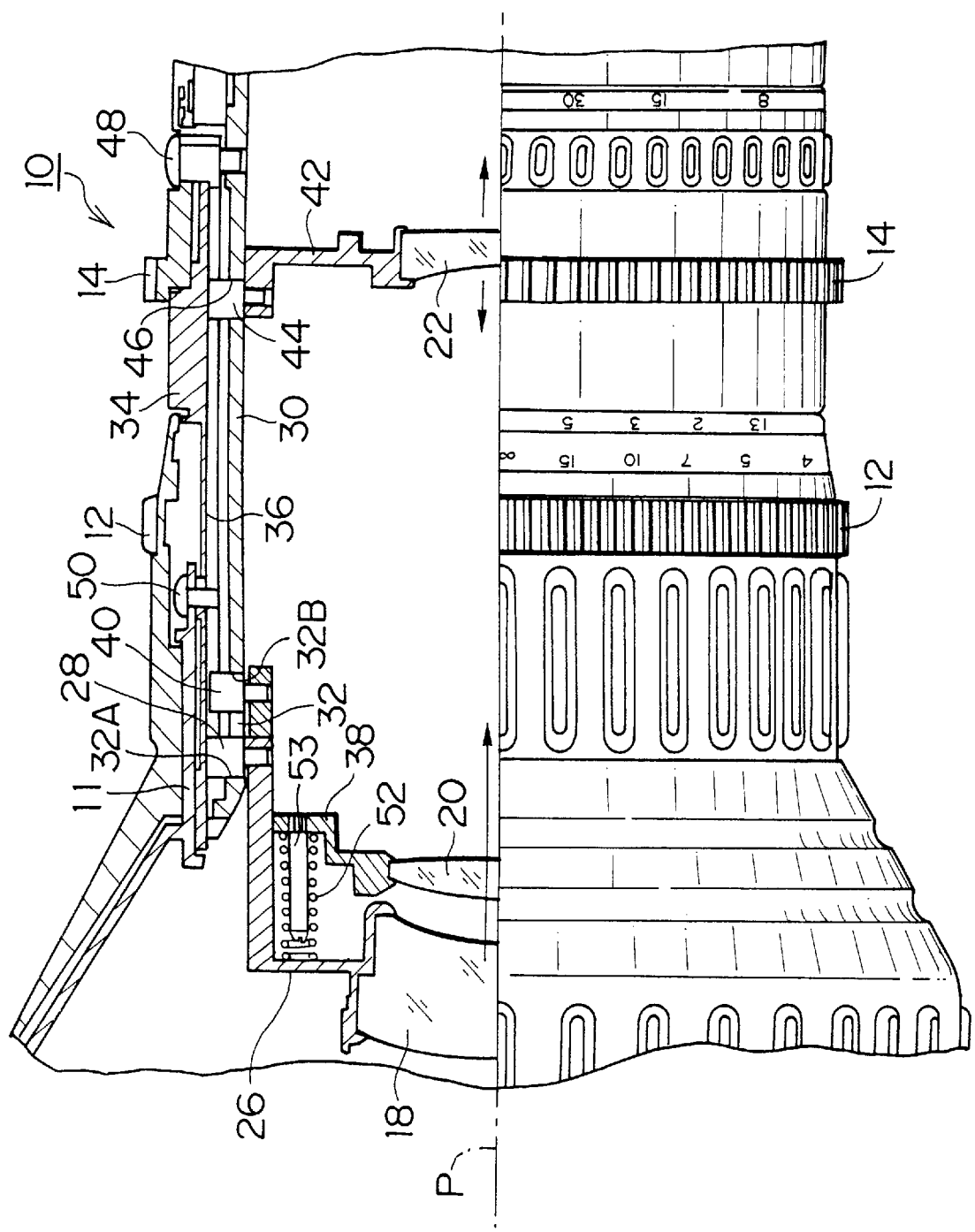
FIG. 2 is a half sectional view showing the essential parts of the zoom lens apparatus in FIG. 1.
Figure 3:
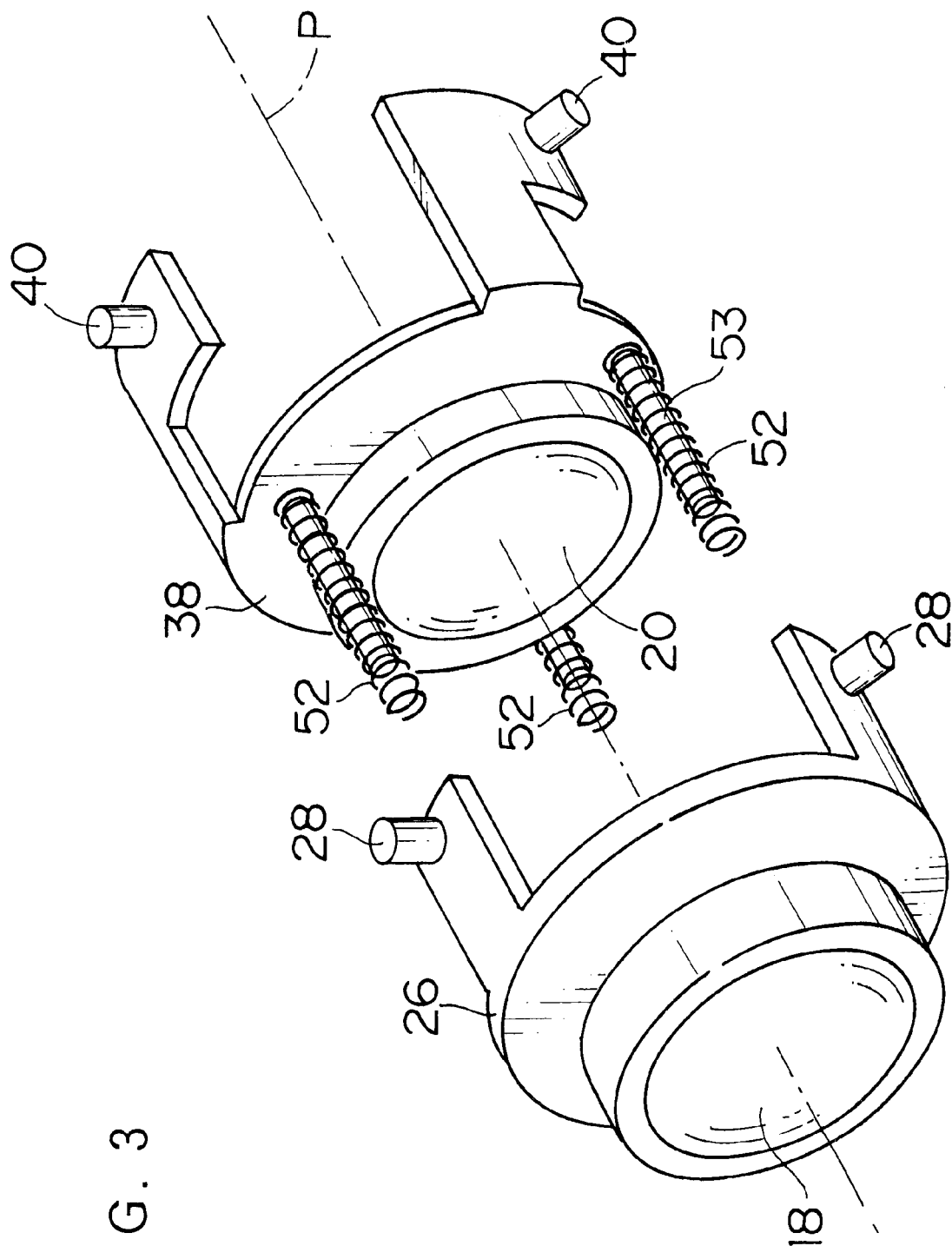
FIG. 3 is a perspective view showing the essential parts of the zoom lens apparatus in FIG. 1, including a variable frame lens group and an aberration correcting lens group.

As shown in FIG. 2, the variable frame lens group 18 is supported in a lens supporting frame 26. As shown in FIG. 3, three cam followers 28 are attached to the lens supporting frame 26 at regular intervals of 120° (FIG. 3 shows two of the cam followers 28). The three cam followers 28 are fitted in three cam grooves 32 formed on a zoom cam cylinder 30 (FIG. 2 shows one of the cam grooves 32). The top ends of the three cam followers 28 project from the cam grooves 32, and they are fitted in three straight grooves 36 of a fixed cylinder 34.

The aberration correcting lens group 20 is supported in a lens supporting frame 38. As shown in FIG. 3, three cam followers 40 are attached to the lens supporting frame 38 at regular intervals of 120° (FIG. 3 actually shows two of the cam followers 40). The three cam followers 40 are fitted in the three cam grooves 32 formed on the zoom cam cylinder 30. The top ends of the three cam followers 40 project from the cam grooves 32, and they are fitted in the three straight grooves 36 of the fixed cylinder 34.

The focus correcting lens group 22 is supported in a lens supporting frame 42. Three cam followers 44 are attached to the lens supporting frame 42, and are fitted in three cam grooves 46 on the zoom cam cylinder 30. The top ends of the cam followers 44 project from the cam grooves 46, and they are fitted in the three straight grooves 36 of the fixed cylinder 34.

The zoom cam cylinder 30 is rotatably supported in the lens barrel 10, and the fixed cylinder 34 is fixed in the body 11 of the lens barrel 10 by a pin 50. The zoom cam cylinder 30 connects to the zoom ring 14 by a pin 48. Thus, the rotation of the zoom ring 14 causes the zoom cam cylinder 30 to rotate with the zoom ring 14.

Consequently, the variable frame lens group 18 is moved forward and backward along an optical axis P, which is corresponding to an axis of the zoom cam cylinder 30, due to the operation of the cam followers 28, the cam grooves 32 and the straight grooves 36. The aberration correcting lens group 20 is also moved forward and backward along the optical axis P due to the operation of the cam followers 40, the cam grooves 32 and the straight grooves 36. Further, the focus correcting lens group 22 is moved forward and backward along the optical axis P due to the operation of the cam followers 44, the cam grooves 46 and the straight grooves 36. These movements adjust the zoom.

Figure 4:
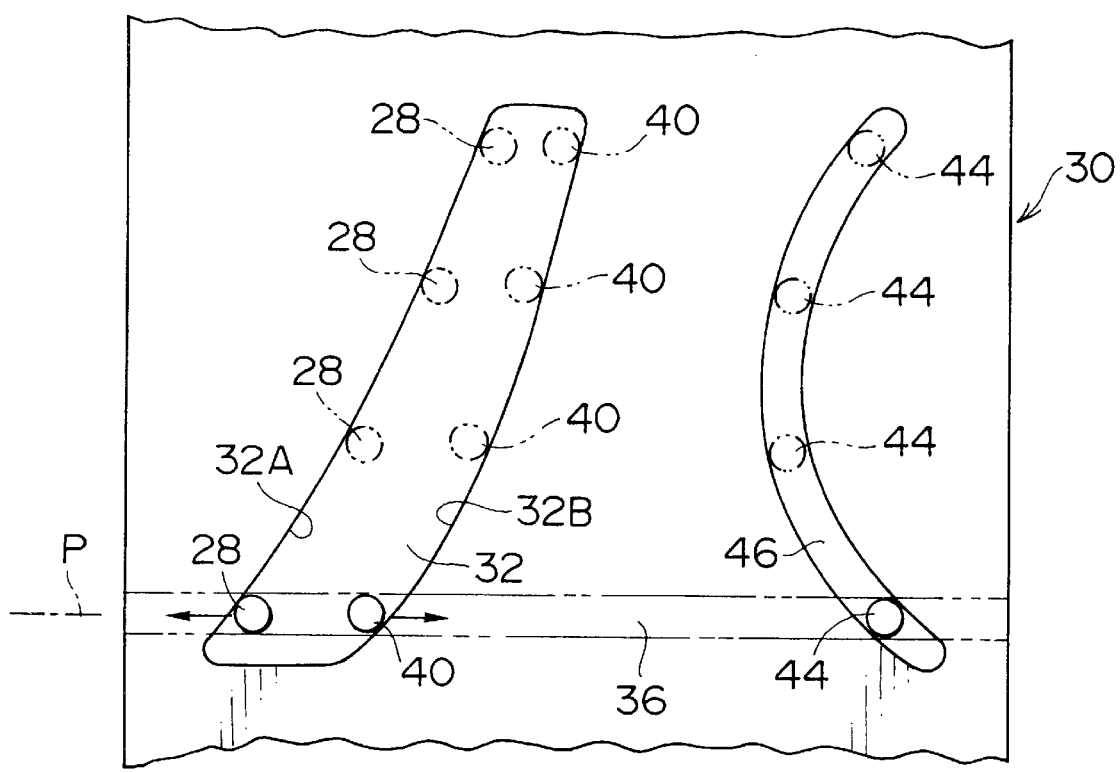
FIG. 4 is a development showing a cam cylinder of the zoom lens apparatus in FIG. 1.

FIG. 4 is a partial development of the zoom cam cylinder 30. The cam followers 28 of the variable frame lens group 18 come into contact with first cam faces or first sides 32A of the cam grooves 32. The cam followers 40 of the aberration correcting lens group 20 come into contact with second cam faces or second sides 32B of the cam grooves 32.

The cam followers 28 and 40 are pressed in such directions as to become farther from each other (as indicated by arrows in FIG. 4) by three coil springs 52, which are arranged between the lens supporting frames 26 and 38 in FIGS. 2 and 3. The three coil springs 52 are wound around three guide pins 53, which project from the lens supporting frame 38. The three coil springs 52 are arranged at regular intervals of 120° on a circle having a center on the optical axis P, and they are arranged as close as possible to the guide pins 28 and 40.

The three cam followers 28 and the three cam followers 40 are forced uniformly by the three coil springs 52. Consequently, the cam followers 28 are pressed against the first sides 32A of the cam grooves 32, so that the variable frame lens group 18 can move along the first sides 32A. The cam followers 40 are pressed against the second sides 32B of the cam grooves 32, so that the aberration correcting lens group 20 can move along the second sides 32B.

According to the zoom lens apparatus of this embodiment, the cam grooves 32 are commonly used for the variable lens group 18 and the aberration correcting lens group 20, which have the similar moving tracks. This reduces the length of the zoom cam cylinder 30 compared with the conventional zoom cam cylinder, which has three kinds of cam grooves for three movable lens groups. Therefore, the zoom lens apparatus of this embodiment can be downsized.

Moreover, the three cam followers 28 are uniformly pressed against the first sides 32A of the three cam grooves 32 by the three coil springs 52, so that the variable frame lens group 18 can move smoothly. Likewise, the three cam followers 40 are uniformly pressed against the second sides 32B of the three cam grooves 32 by the three coil springs 52, so that the aberration correcting lens group 20 can move smoothly.

In this embodiment, the cam grooves 32 are commonly used for the variable frame lens group 18 and the aberration correcting lens group 20, but the present invention should not be restricted to this. Cam grooves can be commonly used for the aberration correcting lens group 20 and the focus correcting lens group 22, or cam grooves can be commonly used for the variable frame lens group 18 and the focus correcting lens group 22.

The number of the cam followers is not restricted to this embodiment. In addition, the number and positions of the springs are not restricted to this embodiment if the cam followers are uniformly pressed by the springs.

In this embodiment, the present invention is applied to the zoom lens apparatus for the TV lens of the ENG camera, but the present invention may also be applied to other zoom lens apparatuses such as a zoom lens apparatus of an electronic field production (EFP) TV lens.

As set forth hereinabove, according to the zoom lens apparatus of the present invention, the cam grooves are commonly used for two lens groups, and this reduces the length of the zoom cam cylinder and downsizes the zoom lens apparatus. Moreover, a plurality of forcing members forces the lens groups, so that the uniform pressure can be applied to the cam followers of the lens groups. This prevents the deviation of the optical axis at the zooming.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A zoom lens apparatus comprising:

a first lens frame supporting a first lens group, the first lens frame having a plurality of first cam followers on an outside thereof;

a second lens frame supporting a second lens group, the second lens frame having a plurality of second cam followers on an outside thereof;

a cylinder supporting the first and second lens frames therein movably on an axis thereof, the cylinder having a plurality of first cam faces and a plurality of second cam faces, the first cam faces having the same first cam curve, each of the first cam faces engaging with each of the first cam followers, the second cam faces having the same second cam curve, each of the second cam faces engaging with each of the second cam followers; and a plurality of forcing members operatively connecting to the first and second lens frames, the forcing members pressing the first cam followers against the first cam faces and pressing the second cam followers against the second cam faces.

2. The zoom lens apparatus as defined in claim 1, wherein the first and second lens groups are two of a variable frame lens group, an aberration correcting lens group and a focus correcting lens group.

3. The zoom lens apparatus as defined in claim 1, wherein:

each of the first cam followers faces each of the second cam followers along the axis of the cylinder; and the plurality of forcing members are provided between the first and second lens frames, each of first ends of the forcing members is arranged close to each of the first cam followers, and each of second ends of the forcing members is arranged close to each of the second cam followers.

4. The zoom lens apparatus as defined in claim 1, wherein the cylinder has a plurality of grooves on the inside thereof, first side walls of the grooves are the first cam faces, and second side walls of the grooves are the second cam faces.

5. The zoom lens apparatus as defined in claim 1, wherein the forcing members are arranged at regular intervals on a circle concentric with the cylinder.

6. The zoom lens apparatus as defined in claim 1, wherein the forcing members comprise coil springs provided between the first and second lens frames.

* * * * *